Nov. 4, 1952          C. A. KOZA          2,616,475

NUT LOCK

Filed Sept. 29, 1948

INVENTOR
CHARLES A. KOZA
BY
*William J. Ruans*
ATTORNEY

Patented Nov. 4, 1952

2,616,475

UNITED STATES PATENT OFFICE 2,616,475

NUT LOCK

Charles A. Koza, Pittsburgh, Pa.

Application September 29, 1948, Serial No. 51,760

1 Claim. (Cl. 151—24)

This invention relates to a nut lock for locking a nut onto a threaded bolt or other threaded shaft.

In the past, locking devices have been employed for locking a nut onto a threaded shaft, but such locking devices have generally been complicated in construction. In some instances, spring biased balls have been employed, but these, however, were merely one-way acting, that is, locked the nut from turning only in one direction, therefore required a pair of such locking devices to provide for two-way locking. Furthermore, commonly used locking devices have had the additional disadvantage of not being positive or reliable in operation and have had great tendency to become loose.

An object of the present invention is to provide a nut lock which is devoid of the above-named disadvantages of commonly used nut locks.

A more specific object of this invention is to provide, in a nut which is screw threaded onto a bolt or other threaded shaft, a locking device which is relatively simple in construction and inexpensive to manufacture.

A still more specific object of this invention is to provide a novel nut lock which is adapted to lock a nut onto a screw threaded shaft or bolt in a manner so that the nut cannot be rotated in either direction.

Figure 1:
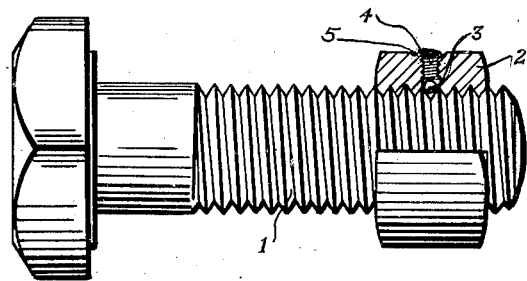
Figure 2:
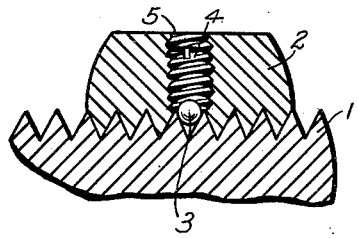

Other objects and advantages of my invention will become apparent from a study of the following specification taken with the accompanying drawing wherein:

Figure 1 is a side view of a bolt and nut assembly, the nut of which embodies a locking device involving the principles of the present invention, and which nut is shown partly broken away and in cross-section to more clearly illustrate the details of the locking device, and Figure 2 is an enlarged fragmentary view of a portion of Figure 1.

Referring more particularly to the figures, numeral 1 denotes a bolt having a screw threaded shank onto which is screw threaded a nut 2. Extending radially through the nut from one outside face portion to the internally threaded portion is a threaded hole into which is dropped a small anti-friction ball 3. A screw threaded stud or set screw 4 of steel or any other suitable material, having a kerf as shown, is screw threaded into such hole and is thereby adapted to clamp the ball 3 between a threaded portion of the bolt confronting the hole and the screw threaded stud or set screw 4. The ball is of such size relative to the threads of bolt 1 as to freely ride therealong when the set screw 4 is loosened.

If desired, the face portion of the nut 2 adjoining the radial hole may be hammered or punched as at 5 so as to peen over or cause some of the metal at the top edge of the hole to overhang the hole and thereby serve as a stop element to prevent withdrawal of the set screw from the hole. Thus, any tendency for the set screw to become lost is eliminated. Of course, when it is desired to remove the set screw, then by forcibly applying a screwdriver, the peened over portions of the metal may be readily broken away.

In operation when the set screw 4 is slightly unscrewed, the ball 3 will be loosely supported within the hole, hence nut 2 may be screwed freely in either direction which merely causes the ball to ride along a spiral path defined by the threads.

However, when it is desired to lock the nut onto the threaded shank of the bolt, the set screw 4 is tightened, thereby clamping the ball between the threads and the set screw and thus making it impossible to turn the nut in either direction. That is, when it is attempted to turn the nut in either direction, the spiral path of movement of the nut along the threads of the shank tends to cause the ball to be displaced axially either in one direction or the other, depending on the direction of rotation of the nut, and in so doing, will raise the ball, slightly, radially outwardly and thereby more securely clamp it between one of the side faces of the thread and the set screw. Therefore, it will be seen that when it is attempted to screw or unscrew the nut, the ball will become more firmly clamped onto one or the other of the side faces of the thread which will cause the nut to become securely locked to the shank. The shaft may be internally threaded, in which case, the collar will be externally threaded.

While for purposes of illustration I have shown an ordinary helical thread of V-shaped cross-section, it will be readily apparent that other types of threads may be used instead, such as threads of square-shaped cross-section, sawtooth cross-section, etc. Furthermore, while the threaded shank is shown as being part of a bolt, it will be apparent that it may be a part of a spindle or any other threaded shaft. Likewise, while the locking element 3 is illustrated as being an anti-friction ball, it may have other shapes, such as tetrahedonal, etc., so long as it is adapted to freely ride along the threads of the shaft portion. Furthermore, while only a single radial hole, ball, and set screw locking assembly is shown, it will be readily apparent that a plurality of these may be employed, if desired, so as to give more ready access to the set screw. For instance, when the nut is used in a crowded assembly, it may be that access in only one radial direction of the nut is available, hence in such case, it would be desired to put as many as one nut locking assembly for each face of the nut so that if a hexagonal nut is used, six locking devices may be selectively used. Of course, a fewer number, such as two or three, may be used instead, depending upon the accessibility by the operator with a screwdriver from different radial directions.

Thus it will be seen that I have provided a relatively simple, inexpensive and highly reliable nut lock for securely and rigidly locking a nut to a threaded bolt or shaft and which nut lock is two-way acting in that it prevents screwing or unscrewing of the nut merely by the simple expedient of firmly clamping a ball between a threaded stud and a groove portion of the threaded shaft.

While I have illustrated and described a specific embodiment of my invention, it will be understood that this is by way of illustration only, and that various changes and modifications may be made within the contemplation of my invention and within the scope of the following claim.

I claim:

A nut lock comprising in combination an externally threaded member the threads of which are of outwardly tapered cross-section, and a nut having an internally correspondingly threaded bore screw threadedly engaged by said externally threaded member, said nut having a substantially radially extending hole of a diameter slightly greater than the pitch of the threads, the axis of said hole substantially intersecting the crest of the thread of the nut, a set screw threadedly mounted in said hole and a metal ball contained within said hole and seated in a groove portion of one of the threads of said member confronting said hole, said ball being of a diameter which is less than the pitch of the thread and greater than half the pitch of the thread of said externally threaded member, said set screw having a substantially flat bottom portion adapted upon tightening to clamp said ball between the surfaces of said groove portion and said set screw so as to lock said nut against rotation in either direction with respect to said externally threaded member.

CHARLES A. KOZA.

REFERENCES CITED

The following references are of record in the file of this patent:

UNITED STATES PATENTS

| Number | Name | Date |
|---|---|---|
| 99,315 | Heermance | Feb. 1, 1870 |
| 215,836 | Rhines | May 27, 1879 |
| 250,448 | Little, Jr. | Dec. 6, 1881 |
| 602,120 | Wright | Apr. 12, 1898 |
| 687,190 | Bartholomew | Nov. 26, 1901 |
| 1,008,086 | Storsberg | Nov. 7, 1911 |
| 1,792,381 | Lescadieu | Feb. 10, 1931 |